United States Patent
Piirainen

(10) Patent No.: US 10,139,228 B2
(45) Date of Patent: Nov. 27, 2018

(54) MICROMECHANICAL SENSOR OF ANGULAR VELOCITY

(71) Applicant: MURATA MANUFACTURING CO., LTD., Nagaokakyo-shi, Kyoto (JP)

(72) Inventor: Tommi Piirainen, Vantaa (FI)

(73) Assignee: MURATA MANUFACTURING CO., LTD., Kyoto (JP)

( * ) Notice: Subject to any disclaimer, the term of this patent is extended or adjusted under 35 U.S.C. 154(b) by 135 days.

(21) Appl. No.: 15/016,751

(22) Filed: Feb. 5, 2016

(65) Prior Publication Data

US 2016/0231115 A1    Aug. 11, 2016

(30) Foreign Application Priority Data

Feb. 11, 2015 (FI) ...................................... 20155095

(51) Int. Cl.
*G01C 19/5712* (2012.01)
*G01C 19/5747* (2012.01)

(52) U.S. Cl.
CPC ..... *G01C 19/5712* (2013.01); *G01C 19/5747* (2013.01)

(58) Field of Classification Search
CPC .................................................. G01C 19/5747
See application file for complete search history.

(56) References Cited

U.S. PATENT DOCUMENTS

| | | |
|---|---|---|
| 7,421,897 B2 | 9/2008 | Geen et al. |
| 8,261,614 B2 | 9/2012 | Hartmann et al. |
| 2010/0116050 A1 | 5/2010 | Wolfram |
| 2012/0013355 A1 | 1/2012 | Narita |
| 2012/0125099 A1 | 5/2012 | Scheben et al. |
| 2012/0210788 A1 | 8/2012 | Gunther et al. |

(Continued)

FOREIGN PATENT DOCUMENTS

| | | |
|---|---|---|
| CN | 101363731 A | 2/2009 |
| EP | 1 793 202 A2 | 6/2007 |

(Continued)

OTHER PUBLICATIONS

Partial International Search Report application No. PCT/IB2016/050633 dated Mar. 18, 2016.

(Continued)

*Primary Examiner* — John Chapman, Jr.
(74) *Attorney, Agent, or Firm* — Squire Patton Boggs (US) LLP

(57) ABSTRACT

A micromechanical device includes four open drive frames and four detection masses for double differentially detecting angular velocity about an axis perpendicular to a plane. A coupling frame system couples the four open drive frames into a synchronized anti-phase driving motion. Phases of each of the four pairs of adjacent open drive frames are opposite, and amplitude of the linear primary motion of the four open drive frames are equal. Axes of linear driving motions of the open drive frames are aligned. Anti-phase synchronized driving motion of the open drive frames is relayed through a spring arrangement to an anti-phase synchronized driving motion of the four detection masses. An inner coupling lever system couples the four detection masses into a synchronized anti-phase detection motion. Phases of each of the four pairs of adjacent detection masses are opposite. Axes of linear detection motion of each of the detection masses are aligned.

18 Claims, 3 Drawing Sheets

(56) References Cited

U.S. PATENT DOCUMENTS

2012/0279300 A1    11/2012  Walther
2013/0167635 A1     7/2013  Su et al.

FOREIGN PATENT DOCUMENTS

| EP | 2 339 293 A1 | 6/2011 |
|---|---|---|
| TW | 498169 B | 8/2002 |
| TW | 200422623 A | 11/2004 |
| TW | 201326750 A | 7/2013 |

OTHER PUBLICATIONS

Taiwanese Office Action application No. 10521411260 dated Nov. 18, 2016.
Taiwanese Office Action application No. 10521414430 dated Nov. 18, 2016.
Finnish Search Report dated Oct. 6, 2015 corresponding to Finnish Patent Application No. 20155095.
Finnish Search Report dated Oct. 6, 2015 corresponding to Finnish Patent Application No. 20155094.
International Search Report for International Search Report Application No. PCT/IB2016/050633, dated Apr. 25, 2016.

MICROMECHANICAL SENSOR OF ANGULAR VELOCITY

BACKGROUND

Field:

The present invention relates to a micromechanical device for detecting angular velocity and especially to a micromechanical device including four detection masses for detecting angular velocity about a single rotation axis perpendicular to the plane of the micromechanical device. The present invention further relates to a method for operating a micromechanical device for detecting angular velocity, and more particularly to a method for operating a micromechanical device including four detection masses for detecting angular velocity about a single rotation axis perpendicular to the plane of the micromechanical device.

Description of the Related Art:

Micro-Electro-Mechanical Systems, or MEMS can be defined as miniaturized mechanical and electro-mechanical systems where at least some elements have a mechanical functionality. Since MEMS devices are created with the same or similar tools used to create integrated circuits, micromachines and microelectronics can be fabricated on the same piece of silicon.

MEMS structures can be applied to quickly and accurately detect very small changes in physical properties. For example, a microelectronic gyroscope can be applied to quickly and accurately detect very small angular displacements.

Motion has six degrees of freedom: translations in three orthogonal directions and rotation around three orthogonal axes. The latter can be measured by an angular rate sensor, also known as gyroscope. In MEMS gyroscopes, Coriolis Effect is used to measure angular rate. When a mass is moving in one direction called the primary motion and rotational angular velocity is applied, the mass experiences a force in orthogonal direction as a result of the Coriolis force. Resulting physical displacement caused by the Coriolis force may be then read from, for example, a capacitive, piezoelectrical or piezoresistive sensing structure. The displacement due to the Coriolis Effect may also be called sense mode. The primary motion may alternatively be called driving motion, primary mode or drive mode.

A gyroscope is a device for detection angular velocity. In a MEMS gyroscope, mechanical oscillation is used as the primary motion. When an oscillating gyroscope is subjected to an angular motion orthogonal to the direction of the primary motion, an undulating Coriolis force will result. This creates a secondary oscillation, also referred to as the sense mode or the detection motion, orthogonal to the primary motion and to the axis of the angular motion, and at the frequency of the primary oscillation. The amplitude of this coupled oscillation can be used as the measure of the angular rate, which term may refer to the absolute value of an angular velocity.

Patent publication U.S. Pat. No. 7,421,897 presents an inertial sensor with cross-quad configuration of four resonator elements. Frames of the adjacent resonator elements are coupled to each other in order to force the frames into anti-phase movement. Resonators are suspended within the frames.

Patent publication U.S. Pat. No. 8,261,614 presents a rotational speed sensor including two capacitively driven resonator elements with a coupling bar placed between two seismic masses for supressing translatory deflections of the seismic masses in reading mode.

An object of the invention is to present an improved resonator structure by suitably coupling the four detection masses with each other via a coupling lever system, allowing anti-phase movement of the detection masses, and preventing in-phase and out-of-phase movement of the detection masses and improving the balance and equalization between the detection masses.

SUMMARY

An object of the present invention is to provide a method and apparatus so as to overcome the prior art disadvantages. The objects of the present invention are achieved with an apparatus according to the invention as disclosed and claimed herein.

Embodiments of the present invention are based on an idea of a dual lever system including an outer lever system facilitating an anti-phase driving motion of four inertial driving elements and an inner lever system facilitating an anti-phase detection motion of four detection masses. The outer lever system may couple both the phases and the amplitudes of the elements in driving motion.

Generally, a linear four-mass gyroscope provides a vibration robust device. Embodiments of the present invention provide an advantage that the outer lever system forces the four inertial elements into equal primary motion, each of which having anti-phase direction with respect to any adjacent inertial elements and may even have equal drive amplitudes between corresponding functional elements in the four inertial elements. Such equal primary motion suppresses the effect of imperfections in device geometry caused for example by non-ideality of manufacturing process.

Another advantage is that detection motion of detection masses is also forced to be synchronized and anti-phase. This enables maximizing the level of the gained detection signals and thus accuracy of detection. A further advantage is that using the inner coupling lever system for setting the amplitudes of detection motions of the detection masses equal improves accuracy and linearity of double differential detection results obtained. A yet further advantage is that the total momentum caused by the device is minimized, since the momenta of the different moving parts essentially cancel each other, so that the device itself causes minimum vibrations.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
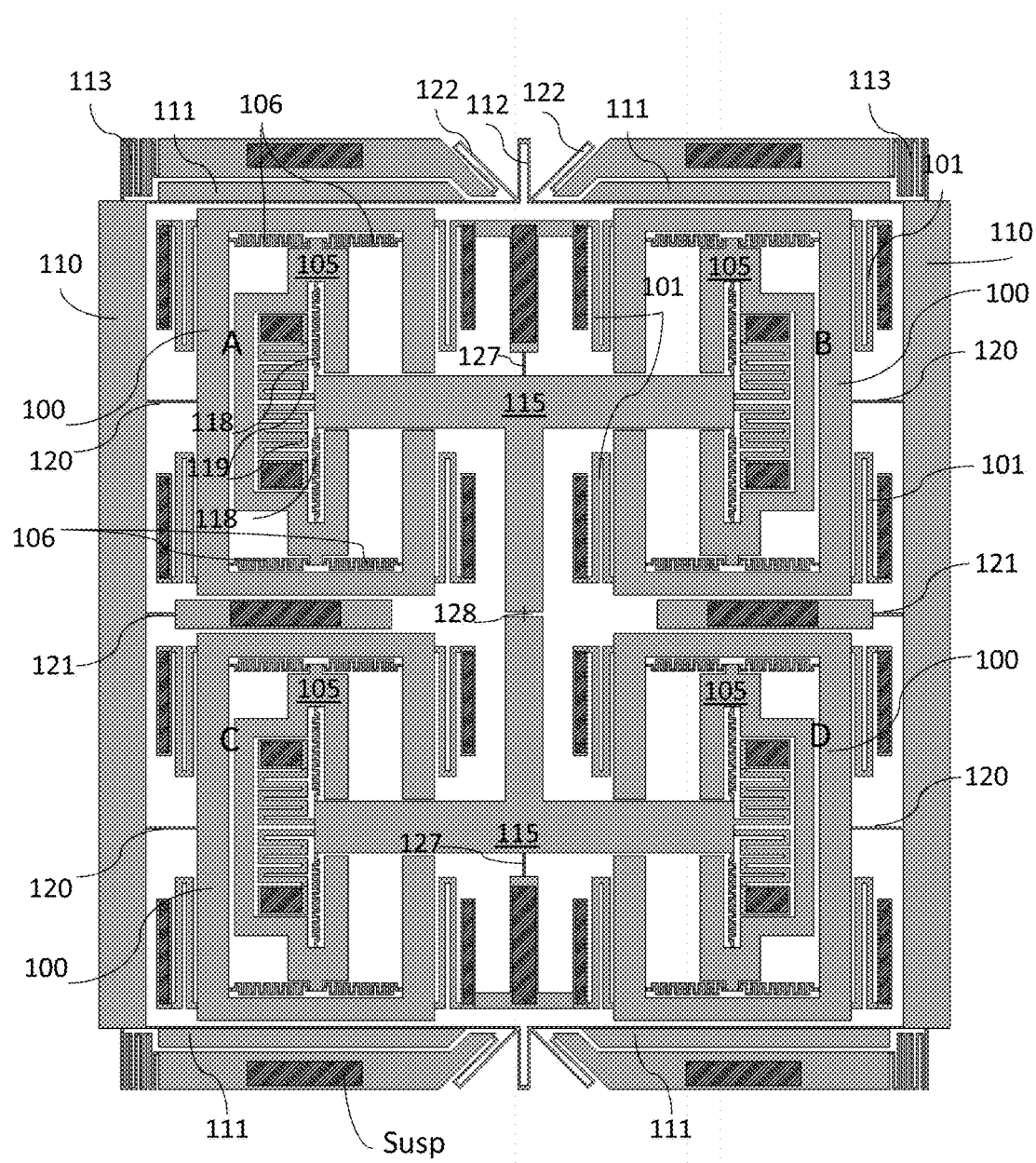
FIG. 1 shows a schematic presentation of an exemplary gyroscope structure.

The FIG. 1 shows a schematic presentation of an exemplary gyroscope structure.

To simplify the description, we can place coordinates to the figure. We can consider the origin being placed in the middle of the structure, in the symmetry point, and the x-axis traverses to left and right in the plane of the device, the y-axis traverses up and down in the plane of the device, and the z-axis direction is perpendicular to both the x- and the y-axis, traversing through the plane of the device. With plane of the device we refer to the plane formed by the structural elements of the device when they are in rest, not excited to any motion.

With the expression "coupling" between two structural elements, we may refer to direct coupling, or a coupling with one or more intermediate elements, such as beams or springs.

The term aligned in relation to axes indicates geometrical and/or functional alignment of axes of symmetry or axes indicating direction of motion, which is within normal tolerances enabled by practical implementation of the device, for example manufacturing tolerances. Such alignment may also be referred to as the axes being essentially aligned.

When a motion is referred to be linear or essentially linear, this indicates that the motion is intended to be linear, so that a moving mass or element may be considered as moving along a straight axis or a line. The terms linear or essentially linear may be used interchangeably.

The gyroscope structure can include, for example, drive resonators, detection resonators, outer coupling lever system, also called as the coupling frame system or in short as the coupling frame, and inner coupling lever system. The inner coupling lever system is located, as the name indicates, inside the gyroscope structure within the periphery formed by the outer edges of the drive resonators and/or the detection resonators. The coupling frame system forms a flexible frame surrounding the drive and detection resonators. The main inertial driving and detection system comprises four drive and detection resonators, arranged in pairs, which are basically in similar motion, but in set phases in respect to each other. These pairs of drive resonators (open drive frames) (100) and detection resonators (detection masses) (105) together with the attached springs are called in combination as inertial elements. Each of the four inertial elements has been assigned a reference letter (A, B, C, D). We can later refer to a specific inertial element as whole or a specific open drive frame or a specific detection mass in these inertial elements with these reference letters. It can be noticed, that inertial elements A and B form a pair which is symmetrical in relation to the y-axis, and inertial elements C and D form another like pair. On the other hand, inertial elements A and C form a pair which is symmetrical in view of the x-axis similar to a like pair formed by inertial elements B and D. Together, the four inertial elements form a quadrangle, fourfold symmetric configuration, which is symmetric in view of both the x- and y-axes of the device. The four inertial elements are configured to detect angular motion about the same, single axis. The inertial elements form two differential detection pairs, both of which configured to provide a differential detection signal. Together, the two pairs of elements provide double differential detection of angular velocity about the same axis. Preferably, the quadrangle configuration has a form of a rectangle divided into a four-field, wherein the inertial elements are each placed in one of the four rectangle fields. More preferably, two sides of the inertial elements are essentially aligned with a motion axis of the inertial elements, such as the axis of the driving motion. According to an embodiment, the quadrangle form is a square. The gyroscope structure includes multiple suspension structures (Susp), which may also be called anchors, which are not individually numbered, but can be easily recognized in the figure, while marked with dark patterned rectangles, while the structural parts of the device capable of moving and/or deforming are marked with light grey color. These suspension structures couple the gyroscope structure with device base element, and can be considered as fixed areas or points in view of the gyroscope structure which otherwise comprises parts capable of moving with respect of each other, and/or deforming.

Drive resonators can include four open drive frames (100) connected to driving means, which in this example comprise drive springs (101). Only drive springs of drive resonator of inertial element B have been numbered in FIG. 1, but it can be seen that all four inertial elements have like drive springs. The coordinates have not been marked in this figure in order to keep the structural parts visible, but should be understood to be similar to what has been marked in FIGS. 2 and 3, the x-axis traversing horizontally, the y-axis traversing vertically and the z-axis being perpendicular to the plane of the device. The origin may be placed in the center of the device. The frame structure of the drive resonators is open, indicating that the frame does not form a closed enclosure, but the frame structure has an opening, thus forming for example a C-like or a U-like shape. This opening in the open frame structure allows the coupling lever (115) to be coupled with the structures residing within the semi-open enclosure formed by the frame. The four open drive frames (100) form a fourfold symmetric configuration. Open drive frames (100) are excited to an essentially linear primary motion, also called driving motion through exciting the drive springs. Drive springs (101) may be excited by piezoelectric actuators. As known to a person skilled in the art, instead of piezoelectric actuation of the drive springs (101), other methods and structures may be used for causing the driving means to drive the open drive frames (100), such as electrostatic actuation with driving combs. Piezoelectric driving has been found beneficial, when small gyroscope structures are expected. The drive springs may be placed symmetrically in view of at least one symmetry axis, which may be aligned with the axis of the driving motion, but they may also be placed unsymmetrically. Symmetrical placement of the drive springs (101) may generally improve linearity of the driving motion of the open drive frames (100). In this example, one end of each drive spring (101 A, B, C, D) is connected to the respective open drive frame (100 A, B, C, D), while the other end is connected to a suspension structure. The details of actuation of a drive element is known to a man skilled in the art, and thus omitted. It should be noticed that the open drive frame is not a closed enclosure, but is a semi-open structure. All four open drive frames (100) are configured for linear driving motion in direction aligned with a single symmetry axis of the device, in the current example this is the x-axis. Thus, the axes of driving motion of the open drive frames (100) are aligned. In this connection, essentially indicates that alignment of the axes is within normal tolerances enabled by practical implementation, for example manufacturing tolerances.

Detection mass (105) is connected to the open drive frame by first springs (106) that relay the essentially linear driving motion to the detection mass. Thus, also the detection mass (105) is excited into an essentially linear driving motion, when the respective open drive (100) is excited to a driving motion. In this example, each detection mass (105) is suspended within a respective open drive frame (100). The four detection masses 105 form a fourfold symmetric configuration. Similarly to the open drive frames, all four detection masses (105) are configured for the linear driving motion in direction aligned with the symmetry axis of the device, in the current example the x-axis. In other words, the axes of driving motion of the four detection masses (105) are aligned. In this connection, essentially indicates that alignment of the axes or alignment of a motion along an axis is within normal tolerances enabled by practical implementation, for example manufacturing tolerances. In this embodiment there are four first springs (106) for each detection mass connecting the detection mass (105) with the open drive frame (100) near each of its four corners. The arrangement of the four first springs (106) may be symmetrical with respect to an axis aligned with the driving motion, in this case an axis which is parallel with the x-axis. The first springs (106) allow the detection mass (105) to move in the y-axis direction in the plane of the gyroscope device, and even out of the plane of the gyroscope in the z-axis direction, but the first springs (106) are relatively stiff in the x-axis direction, thus causing the detection mass to move along the respective open drive frame in the direction of the driving motion. The exact number of the first springs (106) may vary according to design, but a symmetrical placement of the first springs (106) enhances linearity of the driving motion. The first springs (106) shall be stiff, having a higher spring constant, in the direction of the driving motion whereas they should be more loose and flexible, have a lower spring constant, in the direction of detection motion, at least. In the presented embodiment, the first springs (106) are formed as meander springs. Although this spring type is less stiff in the x-axis direction than for example a simple beam spring, it provides the detection mass (105) the needed freedom to move in the y-axis direction for detection motion. However, any other suitable forms of springs could be used as first springs (106) without departing from the scope.

A T-shaped coupling lever comprises two beams, a first beam and a second beam, arranged in a T-like form so that a first end of the first beam is attached to a side of the second beam half-way of length of the second beam. We may also call the first beam as a vertical beam of the T-shape coupling lever and the second beam as a horizontal beam of the T-shape coupling lever. Half-way in this connection indicates that the attachment point is substantially half-way, in the middle of the structure, but the location may vary slightly within the manufacturing tolerances. The two T-shaped coupling levers (115) are part of the inner coupling lever system. Detection springs (119) are suspended in this exemplary embodiment in a semi-open enclosure inside each detection mass (105), so that the opening in the detection mass (105) allows the T-shaped coupling lever (115) to reach the enclosure in the plane of the detection mass (also in the plane of the device). In the presented embodiment, there are two detection springs (119) attached to each end of the first beam of each of the T-shaped coupling levers (115), symmetrically along an x-direction axis. One end of each detection spring (119) is fixed to a suspension point, whereas the other end is coupled to the coupling lever (115). The detections springs (119) do not move when only driving motion is present. When detection motion of the detection masses (105) occurs, also the coupling lever (115) starts to move in the y-axis direction in rotating motion in the xy-plane (in the plane of the device) together with the detection masses (105) attached to the coupling lever, the detection springs (119) start to move, and while this movement causes deformation of the detection springs (119), the movement may be electrically detected. In this example, the detection is based on piezoelectric phenomena related to the detection springs (119). Symmetrical structure of the detection springs (119) further improves linearity and stability of the detection motion, but is not necessary for achieving the functionality of the claimed invention. It can further be noticed that the open drive frame is not a closed frame, but an open frame with an opening allowing the coupling lever (115) to be coupled with the detection mass (105) placed in an enclosure within the open drive frame so that the coupling structure is in the plane of the device. Thus, the opening in the open drive frames (100) enables using the coupling levers (115) for coupling the phases and amplitudes of the detection masses (105) with each other in detection motion. The open drive frame may be characterized as a U- or C-shape frame.

An outer lever system, called as the coupling frame system includes levers and springs, the outer lever system surrounding the four inertial elements. Preferably, the levers of the outer lever system are formed as beams, but they may have other forms as well. The coupling frame system is suitably coupled to the open drive frames for guiding the movement of the coupling frame system and also to cause the open drive frames to move in opposite phases. The coupling frame system couples all four open drive frames with each other and allows them to move in defined phases when compared to each other, while preventing the driving motion in other relative phases. The movement of the open drive frames will be further discussed in relation to FIG. 2. The coupling frame system further balances and equalizes the driving motion between the open drive frames. A vertical lever (110) couples two open drive frames (100) adjacent to each other in the y-axis direction (in this example open drive frames A and C and open drive frames B and D), and the vertical lever (110) is coupled to the two adjacent open drive frames (100) with first coupling springs (120). It should be noticed that we use term adjacent in relation to the open drive frames (100) even if there may be some structural parts between the two masses. The term adjacent should be understood in this connection describing that the two open drive frames are part of adjacent inertial elements. Exactly one spring couples each open drive frame to one vertical lever (110). The first coupling springs (120) are preferably stiff in the x-axis direction, in the direction of the driving motion. The vertical lever (110) is further coupled to a suspension structure with a second coupling spring (121) placed at half-way of the length of the vertical lever (110) in the y-axis direction. Half-way in this connection indicates that the attachment point is substantially half-way, in the middle of the structure, but the location may vary slightly within the manufacturing tolerances. This spring binds the middle of the vertical lever (110) in an approximately fixed position, but allows the vertical lever (110) a rotation motion in the plane of the gyroscope device around this fixing point. This motion will be further discussed in relation to FIG. 2. In the current embodiment, the first coupling springs (120) and the second coupling spring (121) are formed as relatively thin beams. Any form of springs may be used, as long as the first coupling springs (120) and the second coupling spring (121) have a relatively high spring constant in direction of the driving motion, but they should allow the needed rotation of the vertical lever (110).

The outer coupling lever system further includes two pairs of horizontal levers (111) coupling the two vertical levers (110) with each other. A second spring arrangement with a loop (112) (a U-shaped form) and two oblique springs (122) couples each pair of horizontal levers (111), and allows the adjacent vertical levers (110) coupled to the second spring arrangement to move in opposite phases while attenuating in-phase movement. The second spring arrangement is connected between the two horizontal levers (111) with two horizontal narrow beams that are aligned with the horizontal levers (111). The loop (112) comprises two relatively long, parallel beams that are orthogonal to the two horizontal levers (111), and a relatively short beam connecting the two parallel beams. The oblique springs (122) are positioned between the loop (112) and the horizontal levers (111), each connected from one end with the loop (112) in or near the root of the loop, for example the point where the loop (112) connects to the horizontal narrow beams. In the provided example, the angle between the loop (112) and the oblique springs is about 45 degrees, but this angle may be chosen freely. The oblique springs (122) also form a loop-like shape with two long parallel beams and an interconnecting short beam. The other end of each oblique spring (122) is connected to a suspension structure (Susp), in this example via a stiff lever structure attached to the respective suspension structure. Third springs (113) couple the coupling frame system to further suspension points near the corner of the outer coupling frame system. The third springs (113) limit unwanted movement of the vertical levers (110) in the z-direction.

The levers of the coupling frame system may preferably be formed as beams that are relatively wide and robust, so that the levers of the outer coupling frame system can be considered as stiff structures.

All four detection masses (105) are interconnected through an inner coupling lever system. The inner coupling lever system includes two coupling levers (115) and a number of springs. A coupling lever (115) couples two adjacent detection masses (105) with each other through fourth springs (118). It should be noticed that we use term adjacent in relation to the detection masses (105) even if there may be some structural parts between the two detection masses, in other words, they are not directly adjacent. The term adjacent should be understood in this connection describing that the two detection masses are part of adjacent inertial elements. In the current exemplary design there are two fourth springs (118) for each detection mass (105), placed in a symmetrical arrangement in view of an x-axis direction symmetry axis of the detection mass (105). In an alternative embodiment, fourth springs (118) are not placed symmetrically. Fourth springs (118) have relatively low spring constant in the x-direction for allowing detection mass driving motion in this direction, but they have a higher spring constant in the y-direction so that detection motion of the detection mass (105) is coupled with the movement of the coupling lever (115). This coupling guides the detection masses (105) to move in opposite phases from each other in detection motion. In the current embodiment, these couplings of the two pairs of detection masses through respective coupling levers (115) extend along two different axes in the x-direction, separated by a non-zero distance, and also separated by a non-zero distance from the symmetry axis (x-axis) of the gyroscope device. Preferably the connections of the two pairs of detection masses with the coupling levers are located symmetrically in view of the x-axis of the gyroscope device.

Each coupling lever (115) is coupled with a bending spring (127) to a suspension point, and the coupling levers are further mutually coupled with each other with a central spring (128). It should be noticed that the central spring (128) traverses through the origin when the device is in rest or in driving motion, but while it is not coupled directly to any suspension point, it may move away from the origin, especially in connection to the detection motion. The bending spring (127) and the central spring (128) allow each coupling lever a rotary movement in opposite phase from each other, which will be further described in relation to FIG. 3. In the current embodiment, the bending springs (127) are formed as beams. The inner coupling levers balance and equalize the detection motion of the detection resonators.

Figure 2:
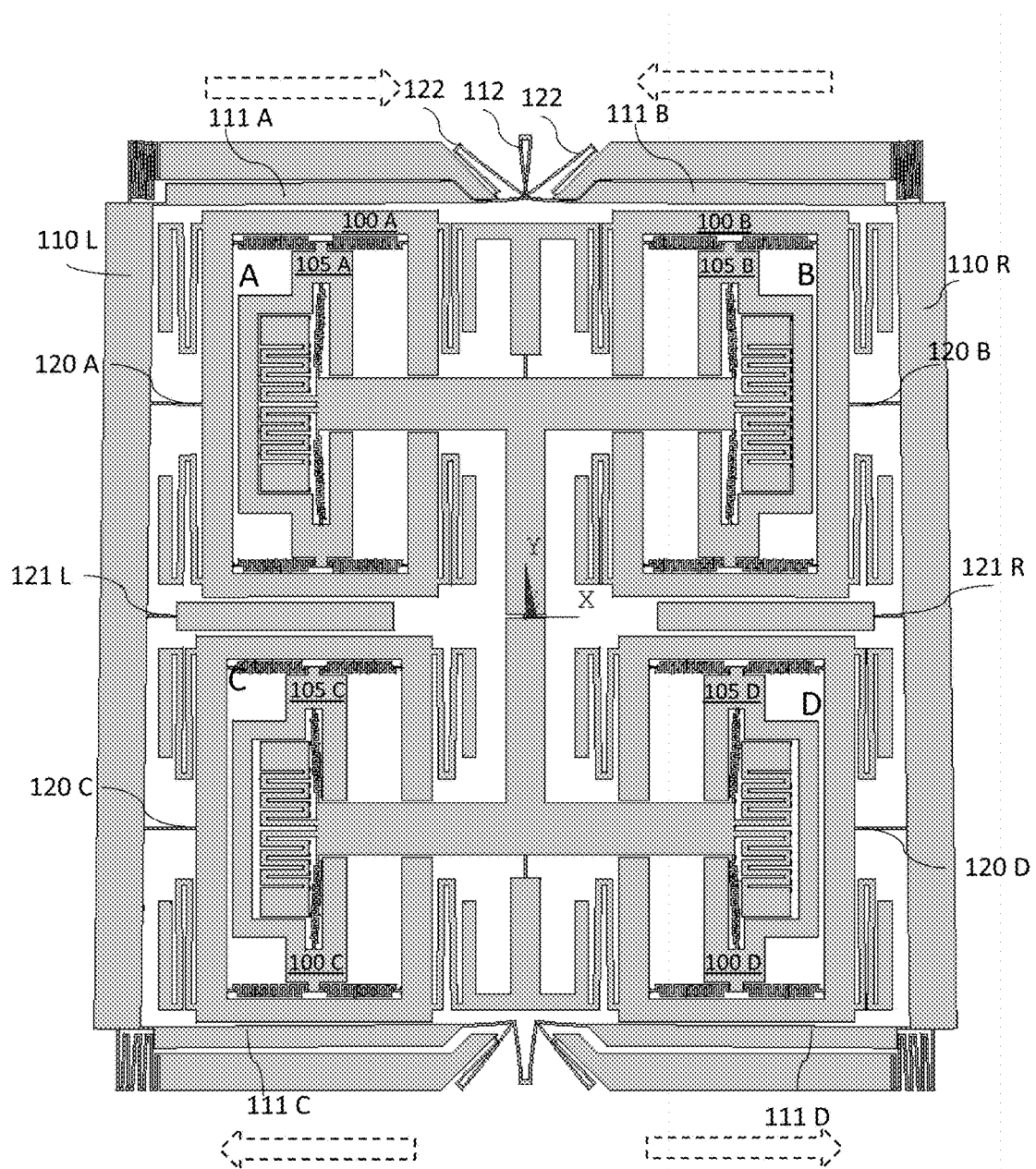
FIG. 2 illustrates the driving motion.

FIG. 2 illustrates the primary motion, also called a driving motion. The building parts will be referred with the same reference numbers as in FIG. 1, but only some of these are added to FIG. 2 for clarity, and additional letters have been used to identify individual structural parts. In FIG. 2, we can see one phase of the driving motion, which may illustrate the position of the structural elements when the driving motion has reached the maximum displacement of the open drive frames (100) in one direction. The driving motion will then reverse, until a maximum displacement is reached in opposite direction. This other maximum displacement position may be illustrated by mirroring FIG. 2 with respect to the x-axis. The displacement of the elements in FIG. 2 has been exaggerated somewhat in order to visualize the motion—in actual device the structural elements located in the same plane may not overlap each other.

In this example, the driving means can include driving springs (101), which excite the open drive frames (100) into a driving motion in the x-axis direction. The driving force is generated in the driving springs (101) through piezoelectric actuation. In an alternative embodiment, the driving means may include driving combs for electrostatic actuation. The open drive frames 100 A and 100 B are excited to opposite phases: then open drive frame 100 A moves to the right in the x-axis direction, open drive frame 100 B moves to the left in the x-axis direction and vice versa. Similarly open drive frames 100 C and 100 D are paired to opposite phases in driving motion. Although the electrical signals driving the driving springs are preferably produced in correct phase, mechanical levers are used to ensure that the driving motion of the open drive frames 100 A, 100 B, 100 C and 100 D have the intended relative phases. The outer coupling lever system, a.k.a. the coupling frame system is introduced for this purpose. Further, through the mechanical coupling provided by the coupling frame system, even the amplitude of the driving motion (drive amplitude) of the open drive frames may be set to be mutually equal. This driving motion in the drive frames (100) with mutually equal drive amplitudes is coupled further via the first springs (106) towards the detection masses (105), causing anti-phase driving motion of the detection masses (105). This coupling may cause the detection masses (105) to have mutually equal drive amplitudes.

The coupling frame system includes two vertical levers (110). Both vertical lever (110) couples two adjacent open drive frames with each other: open drive frames 100 A and 100 C are coupled with vertical lever 110 L, and open drive frames 100 B and 100 D with vertical lever 110 R respectively, through first coupling springs (120). While open drive frame 100 A moves right in x-axis direction towards open drive frame 100 B, the end of the vertical lever 110 L residing on the left side of the open drive frames 100 A and 100 C, coupled to open drive frame 100 A through the first coupling spring (120) A will also move to right. At the same time, open drive frame 100 C moves left in the x-axis direction, and the end of the vertical lever 110 L adjacent to the open drive frame 100 C moves left in x-axis direction, while it's coupled with the open drive frame 100 C with another first coupling spring 120 C. While the second coupling spring 121 L couples the vertical lever 110 L to a fixed structure, the vertical lever 110 L becomes inclined, and it relays the movement of the open drive frames 100 A and 100 C to each other, ensuring that they move in opposite phases. The direction of the linear movement of the drive frames (100) has been visualized with the dashed arrows outside the gyroscope element. These directions will reverse in the opposite phase. The vertical lever 110 L equalizes the movement of the open drive frames attached to it. First coupling springs 120 A, 120 C are preferably coupled to the open drive frames 100 A, 100 C along two x-axis direction lines separated by a non-zero distance, which traverse through a symmetry line of the open drive frames that is in the x-axis direction. This enhances linearity of the described vertical lever movement and also linearity of the open drive frame movement. Vertical lever 110 R on the right of the structure coupled to open drive frames 100 B and 100 D moves in a similar manner as the other vertical lever 110 L, but in opposite phase. In other words, while first ends of the two vertical levers 110 L and 110 R move towards each other in the x-axis direction, the other ends will move away from each other in the x-axis direction. We can notice that first coupling strings 120 A and 120 B are on the same line, that traverses the open drive frames 100 A and 100 B and the detection masses 105 A and 105 B through a common straight line. In the presented example, this common straight line is aligned with a symmetry axis of the open drive frames 100 A and 100 B and detection masses 105 A and 105 B, facilitating symmetry of the movement and stabilizing and equalizing the driving motion. In an alternative embodiment, either the open drive frames 100 A and 100 B or the detection masses 105 A and 105 B may be designed for having a non-symmetrical design in respect to this line. Similarly, first coupling strings 120 C and 120 D are placed on a straight line in the x-axis direction, that traverses through open drive frames 100 C and 100D and detection frames 105 C and 105 D along their symmetry axis.

In practice, each one of the vertical levers (110) is in a motion that can be considered as rotation motion in the xy-plane. However, while the amount of inclination is very small, the movement of the ends of the vertical levers (110), and especially the movement of the first coupling springs (120) can be considered almost linear in x-axis direction. The movement of the various structural components of the gyroscope structure has been exaggerated in this figure for visual purposes, and actual movement of the physical components may be smaller than what is shown.

The coupling frame system further includes four horizontal levers (111). The vertical levers 110 L and 110 R are coupled with horizontal levers 111 A, 111 B, 111 C and 111 D. There are two horizontal levers (111) coupled between both respective ends of the two vertical levers (110), coupled with the further spring arrangement comprising a loop (112) and two oblique springs (122). A similar further spring arrangement can be found between horizontal levers 111 A and 111 B and between horizontal levers 111 C and 111 D, respectively. In driving motion, the horizontal levers (111) have a component of movement in x-axis direction, so that two adjacent horizontal levers (111) move towards each other in x-axis direction when the respective ends of the vertical levers (110) move towards each other, and the horizontal levers (111) move away from each other in x-axis direction when the respective ends of the vertical levers (110) move away from each other. It can be seen, that the horizontal levers may also have a component of movement in y-axis direction, so that they experience some inclination during the driving motion. The purpose of the horizontal levers (111) is to couple the vertical levers (110) with each other, and relay the movements of the two vertical levers (110) with each other, so that the two vertical levers move in opposite phases. This arrangement facilitates a further equalization of the open drive frame movement so that in the driving motion, even the phases of open drive frames 100 A and 100 D, and the phases of open drive frames 100 B and 100 C are coupled to each other and are in same phase: when open drive frame 100 A moves to the left, also open drive frame 100 D moves to the left, and when open drive frame 100 B moves to the right, also open drive frame 100 C moves to the right, and vice versa. In other words, the coupling frame system couples the driving motion of each pair of non-adjacent open drive frames (100 A and D; 100 B and C) into equal phase (in-phase motion), while coupling each pair of adjacent open drive frames (100 A and B; 100 B and D; 100 A and C; 100 C and D) into opposite phase (anti-phase motion). We can also notice that when open drive frames 100 A and 100 B move towards each other, open drive frames 100 C and 100 D move away from each other, so that the two pairs of open drive frames may be considered to move in opposite phase from each other. We can call this kind of driving motion of the four open drive frames as described above, in which the relative phases of the open drive frames is set so that each adjacent open drive frame has phase opposite to the phase of the adjacent open drive frames and both open drive frame pairs have phase opposite to the other open drive frame pair, as synchronized anti-phase driving motion. In other words, in each of the four pairs of adjacent open drive frames (100 A, 100 B; 100 A, 100 C; 100 C, 100 D; 100 B, 100 D), two adjacent open drive frames move in opposite phases. In addition to the two pairs of inertial elements configured to provide differential detection signal, this synchronization thus concerns also adjacent open drive frames of the two different pairs of inertial elements. While allowing the anti-phase driving motion of the open drive frames (100), the coupling frame system also prevents in-phase driving motion and out-of-phase driving motion. With out-of-phase we refer to any motion that is not in-phase or anti-phase (opposite phase), but the phase difference between two elements is anything but 0 (in-phase) or 180 (anti-phase) degrees. Benefit about such synchronized anti-phase motion is for example that the total momentum of the device is minimized, since the momenta of the different parts cancel each other. The synchronized anti-phase driving motion of the open drive frames (100) is further relayed through the first springs (106) to the respective detection masses (105), so that the detection masses (105) will be synchronized into an anti-phase primary motion (driving motion) with respect to each other. The first springs (106) are stiff (have high spring constant) in the direction of the driving motion so that the phases of the detection masses (105) follow the phases of the respective open drive frames (100), in other words, the anti-phase driving motion of the open drive frames (100) is relayed to the detection masses (105) through the first springs (106), causing the detection masses (105) an anti-phase primary motion, which is further synchronized with the anti-phase driving motion of the open drive frames (100). The coupling frame system not only couples the mutual phases of the open drive frames (100), but it also couples the open drive frames (100) to have mutually equal drive amplitudes (amplitude of the driving motion). The mutually equal drive amplitudes of the drive frames (100) are further relayed through the first springs (106) to the detection masses (105), causing also the detection masses (105) to have mutually equal drive amplitudes, which ensures equal Coriolis force to be caused at the sensing elements (detection masses 105). With mutually equal drive amplitude we refer to the essentially equal magnitude of amplitudes of functionally similar elements during the primary motion, within the normal manufacturing tolerances. Both the synchronized anti-phase driving motion of the drive frames (100) and the synchronized anti-phase primary motion of the detection masses (105) contribute to the same technical benefit, minimizing the total momentum of the device when excited into the primary motion.

Figure 3:
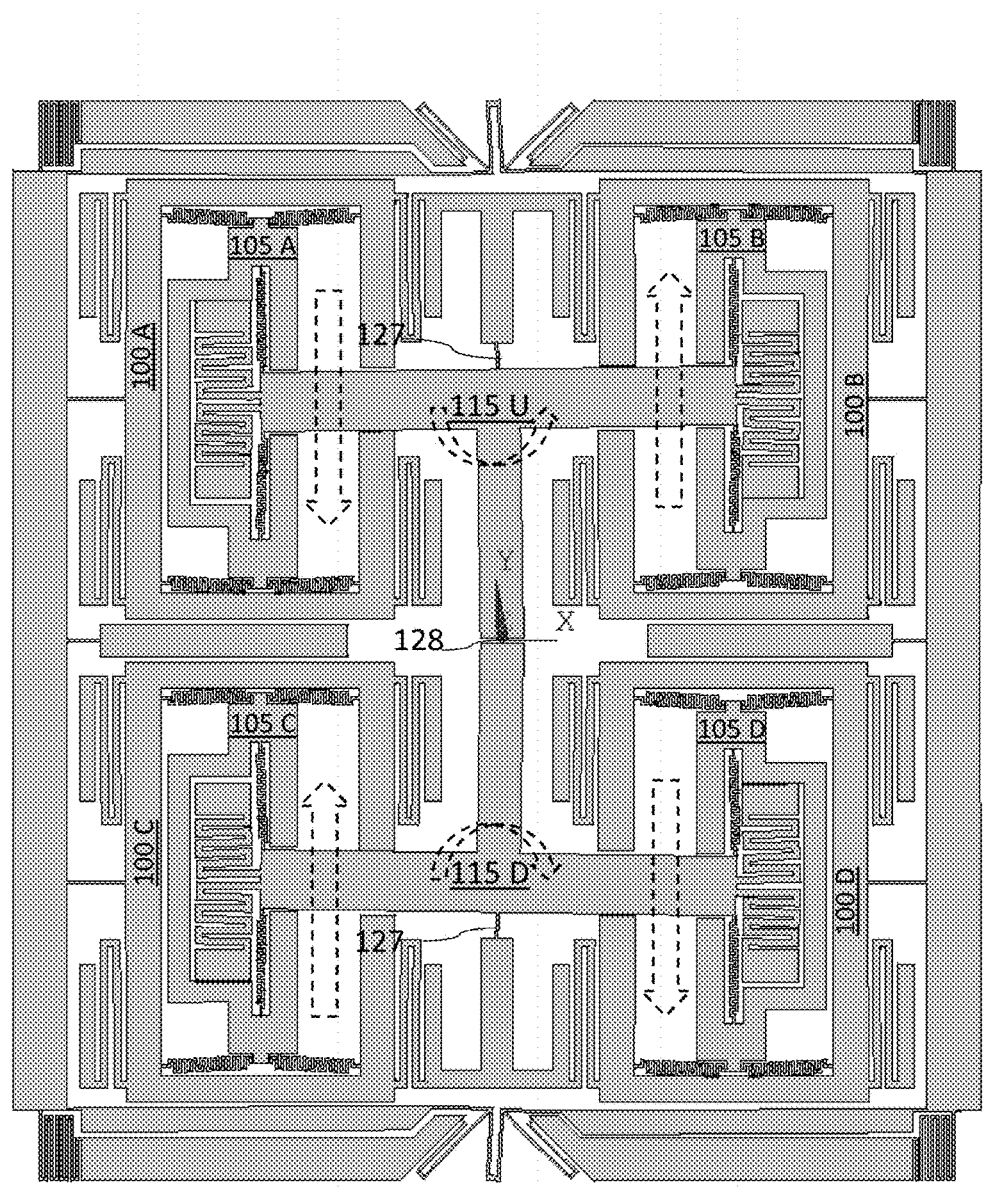
FIG. 3 illustrates the detection motion.

FIG. 3 illustrates the secondary, detection motion. The building parts will be referred the same references as in FIG. 1, but these only some of these have been added to the figure for clarity, and additional letters have been used to identify individual structural parts. In FIG. 3, we can see one phase of the detection motion, which may illustrate the position of the structural elements when the detection motion has reached the maximum displacement of the detection masses in one direction. The detection motion will then reverse, until a maximum displacement is reached in opposite direction. This other maximum displacement position may be illustrated by mirroring FIG. 3 with respect to the y-axis. The displacement of the elements in FIG. 3 has been exaggerated somewhat in order to visualize the motion—in an actual device the structural elements located in the same plane may not overlap each other.

While this gyroscope device is designed to detect and measure angular velocity in about the z-axis, the detection motion of the inertial elements occurs in the plane of the elements, in this example in the y-axis direction. In other words, axes of detection motion of all four detection masses are aligned. The directions of driving motion and detection motion can easily be switched by turning the device 90 degrees within the plane of the device, but the detection axis remains the same. When the gyroscope device presented in this figure experiences angular velocity about the z-axis, Coriolis force causes the detection masses (105) to gain an oscillating detection motion in the y-axis direction. The coupling lever 115 U couples the pair of adjacent detection masses 105 A and 105 B and the coupling lever 115 D couples the pair of adjacent detection masses 105 C and 105 D with each other. The coupling levers (115) become in a rotary motion within the xy-plane, visualized by the rounded, dotted arrows. The coupling lever 115 U couples the detection masses 105 A and 105 B to each other so that the phases of the detection mass movement in y-axis direction are opposite. When one side of the first coupling lever 115 U moves towards the negative y-axis, the opposite end will move towards the positive y-axis. In this figure we can see that detection mass 105 A has moved down essentially in direction of the negative y-axis, while detection mass 105 B moved up essentially in direction of the positive y-axis, and the coupling lever 115 U is in rotary motion about the center of gravity of the horizontal beam of the T-shape coupling lever 115 U. The essentially linear detection motion of the detection masses (105) has been visualized with the straight dashed arrows and the rotary motion of the coupling levers with the curved dashed arrows. In opposite phase, the directions will be reversed. The other coupling lever 115 D couples the detection masses 105 C and 105 D, and become in rotary motion within the xy-plane, but having an opposite angle of rotation when compared to coupling lever 115 U, and the coupling lever 115 D is in rotary motion around the center of gravity of the horizontal beam of the T-shape coupling lever 115 D. Thus each coupling lever 115 U and 115 D couple the two detection masses (105) respectively attached to them into detection motions that have opposite phases.

The rotary motions of the coupling levers 115 U and 115 D are facilitated by the bending springs (127) and the central spring (128), which is common to the two coupling levers. While the central spring (128) connecting the two coupling levers (115) with each other is not attached to any fixed point, the central spring (128) may bend and even slightly move in relation to the origin. The central spring relays the relative movement of the two coupling levers (115) to each other, causing the rotary motion of each being in opposite phase of the other. This way the coupling levers 115 U and 115 D relay the phases of detection motion of all four detection masses with each other, facilitating a synchronized detection motion, where each of the adjacent detection masses move in opposite direction of each other. In other words, in each of the four pairs of adjacent detection masses (105 A, 105 B; 105 C, 105D; 105 A, 105 C; 105 B, 105 D) the two adjacent detection masses have opposite phase of each other in the synchronized anti-phase detection motion. We may further describe the relative detection motion of the detection masses as follows: When the left side of the coupling lever 115 U moves towards negative y-axis together with the detection mass 105 A, the left side of the coupling lever 115 D moves into direction of positive y-axis with detection mass 105 C and vice versa. Thus, the two pairs of detection masses, first pair 105 A and 105 B and second pair 105 C and 105 D are synchronized to each other through the coupling levers and the bending springs (127) and the central spring (128) so that each pair is in detection motion in opposite phase of that of the other pair. On the other hand, when looking at detection motion of individual detection masses, we can notice that detection masses 105 A and 105 D move in mutually same phase whereas detection masses 105 B and 105 C move in mutually same phase which is opposite to the phase of the former pair. Thus, this arrangement ensures that also the phases of detection motion of all four detection masses are in practice synchronized with each other. While the current device has two differential pairs of detection masses, each pair configured for differential detection, and wherein each pair is arranged to have a detection motion in mutually opposite phases, the arrangement may be said to perform double differential detection. Each of the four detection masses is configured to detect the same angular motion about the same single axis, which is, in the current example, the z-axis. This axis may be called as a detection axis. We can call this kind of secondary or detection motion of the four detection masses, where the relative phases of each of the detection masses (105) are set so that the detection motion of each detection mass has phase that is opposite to the phase of either of the adjacent detection masses, as synchronized anti-phase detection motion. Further, the amplitudes of the detection masses (105) may be caused to be equal in detection motion through the coupling provided by the inner coupling lever system (115 U, 115 D). While allowing the anti-phase detection motion of the detection masses (105), the inner lever system also prevents in-phase detection motion and out-of-phase detection motion. Through synchronizing the phases of the detection motion of detection masses of each differential pair of detection masses (105 A, 105B; 105 C, 105 D), the level of the gained differential detection signals from the detection springs may be maximized and thus the accuracy of the measurement is improved when compared to a system where movement of the detection masses are not synchronized. Further, using the inner lever system for equalizing even the amplitudes of the detection motion of the detection masses (105) further improves accuracy and linearity of double differential detection results. Yet further, the total momentum of the entire device is minimized, since the momenta of the different parts cancel each other, so that the device itself causes minimum vibrations. Thus, erroneous sensing signals caused by vibrations caused by the device itself may be minimized. The movement of the components of the gyroscope structure has been exaggerated in this figure for visual purposes, and actual movement of the physical components may be smaller than what is shown.

It should be understood that although FIGS. 2 and 3 present the driving and detection motions separately, these occur simultaneously when the gyroscope element is subjected to angular velocity in direction of the measurement axis. The oscillating linear or rotating motion of different structural elements described above may comprise additional motion components on top of the pure, intended driving or detection motion. Often these unwanted motion components may be caused by non-idealities of the manufacturing process, and/or some acceptable non-idealities obliged by design constraints. Examples of such design based non-idealities are some non-symmetrical arrangements of springs or non-symmetrical lever or mass structures. Thus, it should be understood that in practical implemented driving motion or detection motion, movement of any structural element may slightly deviate from an ideal direction of the motion of the structural element, and/or the relative direction of the driving and detection motions may deviate from exactly perpendicular arrangement. We use the term perpendicular when the directions are substantially perpendicular within normal error tolerances.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A micromechanical device for detecting angular velocity, comprising:
    four open drive frames configured to be driven by exciting into an essentially linear driving motion;
    four detection masses configured to double differentially detect angular velocity about an axis perpendicular to the plane of the micromechanical device;
    a plurality of first springs coupling each one of the four detection masses to a respective one of the four open drive frames, the first springs being configured to relay the essentially linear driving motion of each open drive frame to the detection mass coupled to it, wherein the plurality of first springs coupling the detection mass to the respective open drive frame are disposed symmetrically with respect to an axis aligned with the driving motion; and
    an inner coupling lever system for coupling the four detection masses into a synchronized anti-phase detection motion, wherein the detection motion of each of the four detection masses is essentially linear,
    wherein mechanical coupling of the four open drive frames by a coupling frame system is configured to cause the four open drive frames to have mutually equal drive amplitudes and the four detection masses are configured to have mutually equal drive amplitudes.

2. The micromechanical device according to claim 1, wherein axes of essentially linear detection motion of said four detection masses are collinear.

3. The micromechanical device according to claim 1, wherein the four open drive frames are coupled to the coupling frame system for coupling said four open drive frames into a synchronized anti-phase driving motion, and wherein axes of essentially linear driving motion of said open drive frames are collinear.

4. The micromechanical device according to claim 3, wherein
    the four open drive frames are disposed in a fourfold symmetric configuration, wherein two adjacent detection masses in each four pairs of adjacent detection masses are configured to move in synchronized manner in phases opposite to one another, wherein
    each of the four open drive frames is coupled with a spring to the coupling frame system, the coupling frame system allowing the synchronized anti-phase driving motion in the plane of the micromechanical device and preventing in-phase and out-of-phase driving motion; wherein
    the four detection masses are placed in a fourfold symmetric configuration, wherein two adjacent detection masses in each four pairs of adjacent detection masses are configured to move in synchronized manner in opposite phase to one another; wherein
    each of the four detection masses is coupled with at least one spring to the inner coupling lever system, the inner coupling lever system allowing the synchronized anti-phase detection motion in the plane of the micromechanical device and preventing in-phase and out-of-phase detection motion; and wherein
    a direction of said synchronized anti-phase driving motion is perpendicular to direction of said synchronized anti-phase detection motion.

5. The micromechanical device according to claim 3, wherein the synchronized anti-phase driving motion is relayed to a synchronized anti-phase primary motion of the four detection masses.

6. The micromechanical device according to claim 3, wherein the synchronized anti-phase driving motion is relayed from each one of the four open drive frames to the respective detection mass by a number of first springs placed symmetrically with respect to an axis aligned with the driving motion.

7. The micromechanical device according to claim 1, wherein the inner coupling lever system comprises:
    two coupling levers, each coupling lever capable of rotating motion in the plane of the device;
    two first bending springs, each coupling one of the two coupling levers to at least one suspension structure; and
    a central spring for mutually coupling the two coupling levers with each other.

8. The micromechanical device according to claim 7, wherein each one of the two coupling levers comprises a first beam and a second beam, wherein
    a first end of the first beam is attached to a first side of the second beam at half-way of the length of the second beam, wherein
    a second end of the first beam is coupled to the central spring mutually coupling the two coupling levers,
    wherein each end of the second beam is coupled to a respective detection mass with at least one first spring,
    wherein the second beam is coupled via one of the first bending springs to a suspension point at half-way of the length of the second beam, on the side of the second beam that is opposite to the side of attaching the first beam, and
    wherein the first bending springs and the central spring are aligned with a symmetry line common to both two coupling levers when the device in rest and in driving motion.

9. The micromechanical device according to claim 1, wherein each detection mass is disposed in an enclosure within the respective open drive frame, the first springs having a higher spring constant in the direction of the driving motion, and a lower spring constant in the direction of the detection motion.

10. A micromechanical device for detecting angular velocity, comprising:
four open drive frames configured to be driven by exciting into an essentially linear driving motion;
four detection masses configured to double differentially detect angular velocity about an axis perpendicular to the plane of the micromechanical device;
first springs coupling each one of the four detection masses to a respective one of the four open drive frames, the first springs being configured to relay the essentially linear driving motion of each open drive frame to the detection mass coupled to it; and
an inner coupling lever system for coupling the four detection masses into a synchronized anti-phase detection motion, wherein the detection motion of each of the four detection masses is essentially linear,
wherein the inner coupling lever system comprises:
two coupling levers, each coupling lever capable of rotating motion in the plane of the device;
two first bending springs, each coupling one of the two coupling levers to at least one suspension structure; and
a central spring for mutually coupling the two coupling levers with each other,
wherein each one of the two coupling levers comprises a first beam and a second beam,
wherein a first end of the first beam is attached to a first side of the second beam at half-way of the length of the second beam,
wherein a second end of the first beam is coupled to the central spring mutually coupling the two coupling levers,
wherein each end of the second beam is coupled to a respective detection mass with at least one first spring,
wherein the second beam is coupled via one of the first bending springs to a suspension point at half-way of the length of the second beam, on the side of the second beam that is opposite to the side of attaching the first beam,
wherein the first bending springs and the central spring are aligned with a symmetry line common to both two coupling levers when the device in rest and in driving motion, and
wherein each end of the second beam of each of the two coupling levers is further coupled to at least one detection spring patterned in an enclosure within the respective detection mass, and the other end of the at least one detection spring is coupled to a suspension structure.

11. A micromechanical device for detecting angular velocity, comprising:
four open drive frames configured to be driven by exciting into an essentially linear driving motion;
four detection masses configured to double differentially detect angular velocity about an axis perpendicular to the plane of the micromechanical device;
first springs coupling each one of the four detection masses to a respective one of the four open drive frames, the first springs being configured to relay the essentially linear driving motion of each open drive frame to the detection mass coupled to it; and
an inner coupling lever system for coupling the four detection masses into a synchronized anti-phase detection motion, wherein the detection motion of each of the four detection masses is essentially linear,
wherein the four open drive frames are coupled to a coupling frame system for coupling said four open drive frames into a synchronized anti-phase driving motion, and wherein axes of essentially linear driving motion of said open drive frames are collinear, and
wherein the coupling frame system comprises
two long levers placed on first opposite sides of the micromechanical device, each long lever coupled with two different adjacent open drive frames, wherein each open drive frame is coupled with exactly one long lever in a single point of coupling, wherein a point of coupling is placed on a symmetry axis of the respective open drive frame; and
four short levers arranged in pairs of two adjacent short levers, each pair of said short levers placed on second opposite sides of the micromechanical device, wherein levers in each pair of short levers are mutually coupled with a first spring arrangement comprising a loop and two oblique springs, the first spring arrangement allowing the two adjacent short levers to move in opposite phase and preventing the two adjacent short levers from moving in same phase, when the driving masses are in driving motion,
wherein adjacent ends of said long levers and short levers are coupled with each other at or near said adjacent ends of the respective levers, and
wherein each of the two long levers is further coupled by a third spring with a suspension structure, at half-way of a length of the long lever, wherein the long lever is configured to rotate in the level of the device about the point of coupling the long lever to the suspension structure.

12. A method for operating a micromechanical device for detecting angular velocity, said method comprising:
providing a micromechanical device including four open drive frames and four detection masses for detecting angular velocity about an axis perpendicular to the plane of the micromechanical device;
driving the four open drive frames by exciting into an essentially linear driving motion;
relaying the essentially linear driving motion from each one of the four open drive frames to the respective detection mass by a plurality of first springs, wherein the plurality of first springs coupling the detection mass to the respective open drive frame are disposed symmetrically with respect to an axis aligned with the driving motion;
coupling the four detection masses into a synchronized anti-phase detection motion with an inner coupling lever system; and
double differentially detecting said angular velocity about said axis with said four detection masses, wherein the detection motion of each of the four detection masses is essentially linear,
wherein mechanical coupling of the four open drive frames by a coupling frame system is configured to cause the four open drive frames to have mutually equal drive amplitudes and the four detection masses are configured to have mutually equal drive amplitudes.

13. The method according to claim 12, wherein axes of essentially linear detection motion of said four detection masses are collinear.

14. The method according to claim 12, further comprising coupling the four open drive frames into a synchronized anti-phase driving motion with the coupling frame system, wherein axes of essentially linear driving motion of said open drive frames are collinear.

15. The method according to claim 14, further comprising exciting the four open drive frames to the synchronized anti-phase driving motion in a fourfold symmetric configuration, wherein each four pairs of two adjacent open drive frames move in synchronized manner in opposite phase to one another;

coupling each of the four open drive frames with a spring to the coupling frame system, the coupling frame system allowing the synchronized anti-phase driving motion in the plane of the micromechanical device and preventing in-phase and out-of-phase driving motion;

causing the synchronized anti-phase detection motion of the four detection masses in a fourfold symmetric configuration, wherein each four pairs of two adjacent detection masses move in synchronized manner in opposite phase to one another; and coupling each of the four detection masses with at least one spring to the inner coupling lever system, the inner coupling lever system allowing the synchronized anti-phase detection motion in the plane of the micromechanical device and preventing in-phase and out-of-phase detection motion;

wherein the direction of said synchronized anti-phase driving motion is perpendicular to the direction of said synchronized anti-phase detection motion.

16. The method according to claim 14, wherein the method comprises relaying the synchronized anti-phase driving motion to the four detection masses for causing a synchronized anti-phase primary motion of the four detection masses.

17. The method according to claim 14, wherein the method comprises relaying the synchronized anti-phase driving motion from each one of the four open drive frames to the respective detection mass by a number of first springs arranged symmetrically with respect to an axis aligned with the driving motion.

18. The method according to claim 12, wherein the exciting of the four open drive frames causes the open drive frames to move in a synchronized anti-phase driving motion with mutually equal drive amplitudes and the four detection masses to move in a synchronized anti-phase primary motion with mutually equal drive amplitudes.

\* \* \* \* \*